US012794575B2

(12) United States Patent
Yao et al.

(10) Patent No.: US 12,794,575 B2
(45) Date of Patent: Nov. 10, 2026

(54) METHOD AND APPARATUS FOR ACQUIRING INDUCED POLARIZATION PARAMETERS BY USING SPREAD SPECTRUM SIGNAL, MEDIUM AND DEVICE

(71) Applicants: CENTRAL SOUTH UNIVERSITY, Changsha City (CN); GIANT SEQUOIA AI TECHNOLOGY (CHANGSHA) LIMITED, Changsha City (CN)

(72) Inventors: Hongchun Yao, Changsha City (CN); Rujun Chen, Changsha City (CN); Zhenwei Guo, Changsha City (CN); Ruijie Shen, Changsha City (CN); Siwen Chen, Changsha City (CN); Haojie Zhang, Changsha City (CN)

(73) Assignees: Central South University, Changsha City (CN); GIANT SEQUOIA AI TECHNOLOGY (CHANGSHA) LIMITED, Changsha (CN)

( * ) Notice: Subject to any disclaimer, the term of this patent is extended or adjusted under 35 U.S.C. 154(b) by 343 days.

(21) Appl. No.: 18/625,747

(22) Filed: Apr. 3, 2024

(65) Prior Publication Data

US 2024/0348347 A1 Oct. 17, 2024

(30) Foreign Application Priority Data

Apr. 13, 2023 (CN) ......................... 202310394021.5

(51) Int. Cl.
*H04B 17/309* (2015.01)
*H04B 1/69* (2011.01)

(52) U.S. Cl.
CPC ............ *H04B 17/309* (2015.01); *H04B 1/69* (2013.01)

(58) Field of Classification Search
CPC .... H04B 1/707; H04B 1/7087; H04B 17/309; H04B 1/69; H04J 13/20; Y02A 90/30;
(Continued)

(56) References Cited

U.S. PATENT DOCUMENTS

2004/0095907 A1* 5/2004 Agee ........................ H04B 7/10 370/400
2011/0083838 A1* 4/2011 LaBrecque .............. G01V 3/20 702/7

(Continued)

*Primary Examiner* — Atique Ahmed
(74) *Attorney, Agent, or Firm* — GRUMBLES LAW PLLC; Brittany Haanan

(57) ABSTRACT

A method and an apparatus for acquiring induced polarization parameters by using a spread spectrum signal, a medium and a device are provided, where the method includes: sending a spread spectrum signal to a detection object and acquiring time sequence data of the spread spectrum signal; acquiring a frequency spectrum value of each main frequency in the spread spectrum signal, and obtaining a normalized complex value of each main frequency based on the frequency spectrum value of each main frequency; obtaining a frequency value of each combined frequency in the spread spectrum signal; calculating a normalized complex value of each combined frequency according to the normalized complex value of each main frequency; and calculating induced polarization parameters of all combined frequencies according to frequency values of all combined frequencies and normalized complex values of all combined frequencies.

18 Claims, 4 Drawing Sheets

(58) Field of Classification Search
CPC ................ G01V 3/38; H04L 25/03159; H04L 5/0021; H04L 25/0228; H04L 25/03006
See application file for complete search history.

(56) References Cited

U.S. PATENT DOCUMENTS

| | | | | |
|---|---|---|---|---|
| 2015/0094914 | A1* | 4/2015 | Abreu | B60T 7/14<br>701/1 |
| 2016/0291194 | A1* | 10/2016 | Marsala | E21B 47/12 |
| 2019/0360312 | A1* | 11/2019 | Thompson | E21B 43/16 |
| 2021/0157025 | A1* | 5/2021 | Seleznev | G01V 3/38 |
| 2021/0305491 | A1* | 9/2021 | Spanier | H01P 7/10 |
| 2023/0006719 | A1* | 1/2023 | Ashrafi | H04B 7/0413 |
| 2023/0079238 | A1* | 3/2023 | Cristache | G07C 9/00174<br>706/46 |

* cited by examiner

METHOD AND APPARATUS FOR ACQUIRING INDUCED POLARIZATION PARAMETERS BY USING SPREAD SPECTRUM SIGNAL, MEDIUM AND DEVICE

CROSS-REFERENCE TO RELATED APPLICATION

This patent application claims the benefit and priority of Chinese Patent Application No. 2023103940215 filed with the China National Intellectual Property Administration on Apr. 13, 2023, the disclosure of which is incorporated by reference herein in its entirety as part of the present application.

TECHNICAL FIELD

The present disclosure relates to the technical field of geophysical electrical exploration, in particular to a method and an apparatus for acquiring induced polarization parameters by using a spread spectrum signal, a medium and a device.

BACKGROUND

An induced polarization method is a geophysical exploration method to solve geological problems by studying the difference between the resistivity and the polarizability of rocks and minerals under the action of an electric field in a time domain or a frequency domain. Compared with other electrical and electromagnetic methods, in solid mineral exploration, the induced polarization method can distinguish mineral-induced anomalies more easily by polarization features, such as anomalies resulted from dense massive lead-zinc deposits and disseminated metal sulfides. A conventional frequency-domain induced polarization method generally uses square wave signals, dual-frequency wave signals and pseudo-random multi-frequency wave signals, and the differences between different transmitted signals are mainly reflected in spectral energy distribution, spectral density and calculation parameters. The energy of square wave signals is mainly distributed in odd harmonics, and the energy decreases rapidly with the increase of harmonic times. Generally, the apparent resistivity, the phase and the percent frequency effect (FS) can only be calculated by using the data of the first 2 to 3 frequency points in the induced polarization acquisition. The dual-frequency wave includes two main frequencies, the interval between the two frequencies is large, and two apparent resistivities, two phases and one percent frequency effect can be calculated. The multi-frequency wave generally contains 3 to 7 frequencies, the interval between the frequencies is large, and the apparent resistivity, the phase and the percent frequency effect can be calculated.

The above methods mainly have the following defects:

(1) The frequency number of the transmitted signals is small and the frequency point interval is large, so that it is impossible to accurately describe the variation law of induced polarization parameters of rocks and minerals in the frequency spectrum.

(2) The main frequency energy of the transmitted signals is uneven, and the signal-to-noise ratio of some frequencies is very low.

(3) The frequency point interval is large, the energy is scattered, and reliable data cannot be obtained in areas with strong interference.

(4) The percent frequency effect and the phase parameter which have been calculated are greatly influenced by coupling, resulting in the distortion of the measured data.

SUMMARY

The present disclosure provides a method and an apparatus for acquiring induced polarization parameters by using a spread spectrum signal, a medium and a device, in order to acquire induced polarization parameters by using the spread spectrum signal and solve the problem that the induced polarization parameters measured by a conventional induced polarization method are distorted due to low frequency domain resolution, weak anti-interference capability and great coupling influence.

In order to achieve the above purpose, the present disclosure provides a method for acquiring induced polarization parameters by using a spread spectrum signal, including:

Step 1, sending a spread spectrum signal to a detection object and acquiring time sequence data of the spread spectrum signal, where the time sequence data includes voltage time sequence data and current time sequence data;

Step 2, according to the time sequence data, acquiring a frequency spectrum value of each main frequency in the spread spectrum signal, and obtaining a normalized complex value of each main frequency based on the frequency spectrum value of each main frequency;

Step 3, obtaining a frequency value of each combined frequency in the spread spectrum signal according to the frequency value of each main frequency;

Step 4, calculating a normalized complex value of each combined frequency according to the normalized complex value of each main frequency; and Step 5, calculating induced polarization parameters of all combined frequencies according to frequency values of all combined frequencies and normalized complex values of all combined frequencies, where the induced polarization parameters include an apparent resistivity, a percent frequency effect and a comparative phase.

Further, the Step 2 includes:

Step 21, acquiring a fundamental frequency $f_0$ and an order N of the spread spectrum signal according to the time sequence data;

Step 22, calculating a number of the main frequencies as $Nf=2^{N-1}$ according to the order N of the spread spectrum signal;

Step 23, calculating a frequency corresponding to each main frequency as $f_i=f_0*i$ according to the fundamental frequency $f_0$ of the spread spectrum signal, where i is a main frequency number from a low frequency to a high frequency; and Step 24, performing Fourier transform on the time sequence data to obtain a transformation result, and reading a k-th value as a frequency spectrum value Z of each main frequency in the transformation result, where k is a frequency point index of each main frequency.

Further, the obtaining a normalized complex value of each main frequency based on the frequency spectrum value of each main frequency includes:

acquiring a frequency spectrum value U of each main frequency in the voltage time sequence data by using a method of calculating the frequency spectrum value of each main frequency in the spread spectrum signal;

acquiring a frequency spectrum value I of each main frequency in the current time sequence data by using the method of calculating the frequency spectrum value of each main frequency in the spread spectrum signal; and calculating the normalized complex value of each main frequency as X=U/I according to the frequency spectrum value U of each main frequency in the voltage time sequence data and the frequency spectrum value I of each main frequency in the current time sequence data.

Further, a formula of calculating the frequency value F; of each combined frequency is:

$$F_j = \sum_{i=p}^{p+n-1} (w_i \times f_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $f_i$ is a frequency of the main frequency.

Further, a formula of calculating the normalized complex value $C_j$ of each combined frequency is:

$$C_j = \sum_{i=p}^{p+n-1} (w_i * X_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $X_i$ is a normalized complex value of an i-th main frequency.

Further, a formula of calculating the resistivity $\rho_j$ is:

$$\rho_j = k * |C_j|$$

where k is an apparatus coefficient calculated by a position of a receiving point and a position of a power supply point, and $C_j$ is an normalized complex value of a j-th combined frequency;

a formula of calculating the percent frequency effect $fs_j$ is:

$$fs_j = (|C_j| - |C_h|)/|C_j|$$

or $$fs_j = (|C_j| - |C_h|)/|C_h|$$

where $C_j$ is a normalized complex value of the j-th combined frequency, $C_h$ is a normalized complex value of an h-th combined frequency, in which h=j+1;

a formula of calculating the comparative phase $cp_j$ is:

$$cp_j = (p - k * \varphi_j)/(1 - k)$$

$$k = F_h / F_j$$

$$p = \begin{cases} \varphi_h, (\varphi_j - \pi \le \varphi_h \le \varphi_j + \pi) \\ \varphi_h - 2*\pi, (\varphi_h > \varphi_j + \pi) \\ \varphi_h + 2*\pi, (\varphi_h < \varphi_j - \pi) \end{cases}$$

where $\varphi_j$ is a phase of the normalized complex value of the j-th combined frequency, $\varphi_h$ is a phase of the normalized complex value of the h-th combined frequency, $F_h$ is a frequency value of the h-th combined frequency, and $F_j$ is a frequency value of the j-th combined frequency.

The present disclosure further provides an apparatus for acquiring induced polarization parameters by using a spread spectrum signal, including:

a first acquisition module, configured to send a spread spectrum signal to a detection object and acquire time sequence data of the spread spectrum signal, where the time sequence data includes voltage time sequence data and current time sequence data;

a second acquisition module, configured to acquire a frequency spectrum value of each main frequency in the spread spectrum signal according to the time sequence data, and obtain a normalized complex value of each main frequency based on the frequency spectrum value of each main frequency;

a first calculation module, configured to obtain a frequency value of each combined frequency in the spread spectrum signal according to the frequency value of each main frequency;

a second calculation module, configured to calculate a normalized complex value of each combined frequency according to the normalized complex value of each main frequency; and a third calculation module, configured to calculate induced polarization parameters of all combined frequencies according to frequency values of all combined frequencies and normalized complex values of all combined frequencies, where the induced polarization parameters include an apparent resistivity, a percent frequency effect and a comparative phase.

The present disclosure further provides a non-transitory computer-readable storage medium in which a computer program is stored, where the computer program, when executed, is configured to implement the method for acquiring induced polarization parameters by using the spread spectrum signal described above.

The present disclosure further provides a device for acquiring induced polarization parameters by using a spread spectrum signal, where the device is configured to implement the method described above, including:

a memory and a processor; where the memory is configured to store a computer program; and the processor is configured to execute the computer program stored in the memory.

The above scheme of the present disclosure has the following beneficial effects.

In the present disclosure, a spread spectrum signal is sent to a detection object and time sequence data of the spread spectrum signal is acquired; according to the time sequence data, a frequency spectrum value of each main frequency in the spread spectrum signal is acquired, and a normalized complex value of each main frequency is obtained based on the frequency spectrum value of each main frequency; a frequency value of each combined frequency in the spread spectrum signal is obtained according to the frequency value of each main frequency; the normalized complex value of each combined frequency is calculated according to the normalized complex value of each main frequency; induced polarization parameters of all combined frequencies are calculated according to the frequency values and the normalized complex values of all combined frequencies, where the induced polarization parameters include an apparent resistivity, a percent frequency effect and a comparative phase. According to the present disclosure, the function of acquiring the induced polarization parameters using the spread spectrum signal is implemented, and the problem that the induced polarization parameters measured by a conventional induced polarization method are distorted due to low frequency domain resolution, weak anti-interference capability and great coupling influence is solved. At the same time, according to the exploration requirements, the frequency density and the number of combined frequencies can also be customized, so as to accurately describe the induced polarization frequency spectral characteristics of rocks and minerals, enhance the signal energy of a single main frequency point and improve the anti-interference capability.

Other beneficial effects of the present disclosure will be described in detail in the following detailed description.

DETAILED DESCRIPTION OF THE EMBODIMENTS

Figure 1:
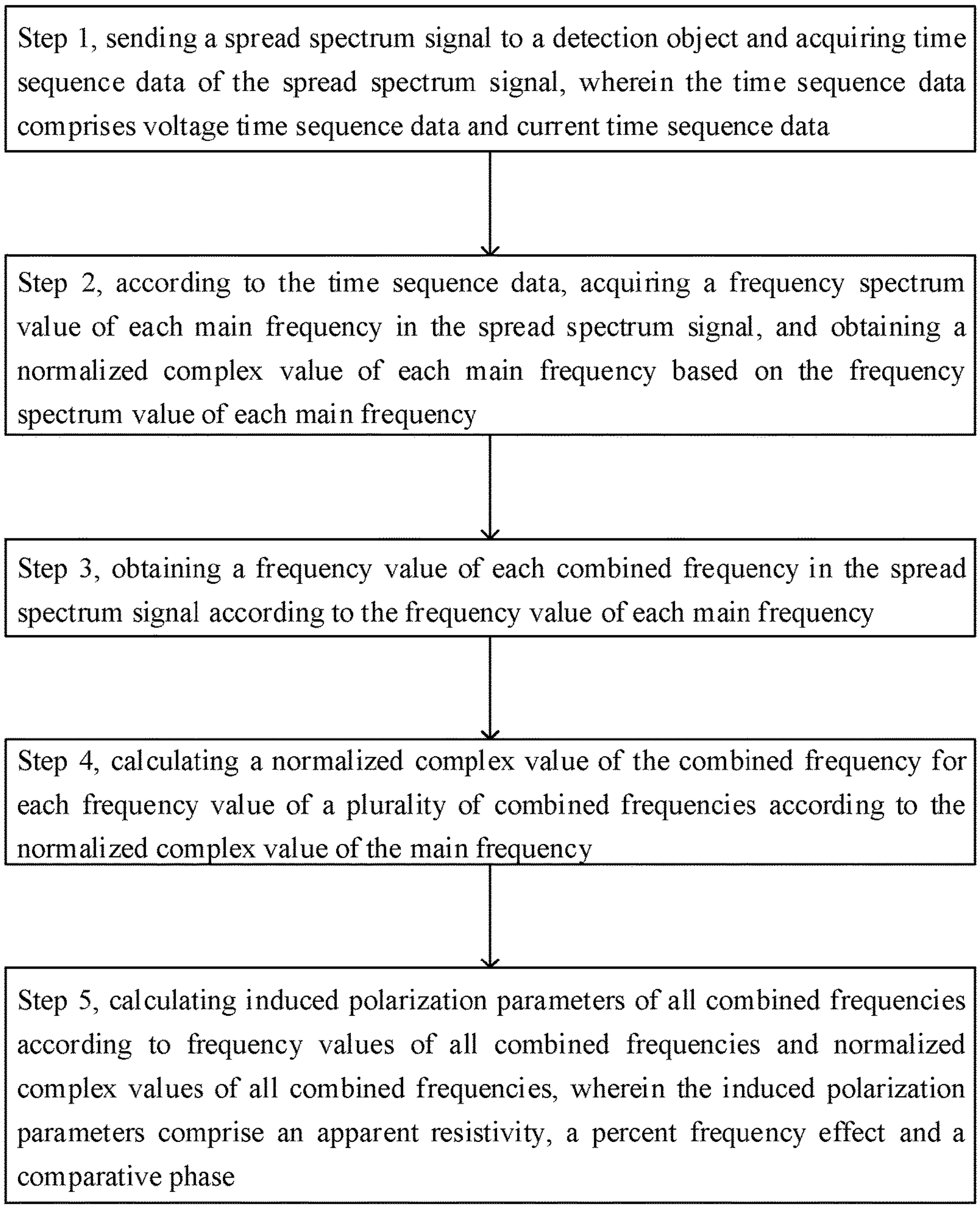
FIG. 1 is a flowchart of an embodiment of the present disclosure.

In order to make the technical problems, technical solutions and advantages to be solved by the present disclosure more clear, the technical problems, technical solutions and advantages will be described in detail hereinafter with reference to the attached drawings and specific embodiments. Apparently, the described embodiment is a part of the embodiments of the present disclosure, rather than all of the embodiments. Based on the embodiments of the present disclosure, all other embodiments obtained by those ordinarily skilled in the art without any creative effort belong to the scope of protection of the present disclosure.

In the description of the present disclosure, it should be noted that the orientational or positional relationships indicated by the terms such as “center”, “up”, “down”, “left”, “right”, “vertical”, “horizontal”, “inside” and “outside” are based on the orientational or positional relationships shown in the drawings, which are only for the convenience of describing the present disclosure and simplifying the description, but do not indicate or imply that the referred devices or elements have to process a specific orientation, be constructed and operated in a specific orientation, and therefore should not be construed as limiting the present disclosure. In addition, the terms such as “first”, “second” and “third” are only used for the purpose of description, and cannot be understood as indicating or implying relative importance.

In the description of the present disclosure, it should also be noted that unless otherwise specified and defined expressly, the terms such as “mount”, “link” and “connect” should be understood broadly, for example, it can be locked connection, detachable connection or integral connection; or mechanical connection or electrical connection; or direct connection or indirect connection through an intermediate medium, or internal communication of two elements. For those ordinarily skilled in the art, the specific meanings of the above terms in the present disclosure can be understood according to specific situations.

In addition, the technical features involved in different embodiments of the present disclosure described hereinafter can be combined with each other as long as the features do not conflict with each other.

Aiming at the existing problems, the present disclosure provides a method and an apparatus for acquiring induced polarization parameters by using a spread spectrum signal and a medium and a device.

As shown in FIG. 1, an embodiment of the present disclosure provides a method for acquiring induced polarization parameters by using a spread spectrum signal, including:

Step 1, sending a spread spectrum signal to a detection object and acquiring time sequence data of the spread spectrum signal, where the time sequence data includes voltage time sequence data and current time sequence data;

Step 2, according to the time sequence data, acquiring a frequency spectrum value of each main frequency in the spread spectrum signal, and obtaining a normalized complex value of each main frequency based on the frequency spectrum value of each main frequency;

Step 3, obtaining a frequency value of each combined frequency in the spread spectrum signal according to the frequency value of each main frequency;

Step 4, calculating a normalized complex value of each combined frequency according to the normalized complex value of each main frequency; and Step 5, calculating induced polarization parameters of all combined frequencies according to frequency values of all combined frequencies and normalized complex values of all combined frequencies, wherein the induced polarization parameters include an apparent resistivity, a percent frequency effect and a comparative phase.

Specifically, the Step 2 includes:

Step 21, acquiring a fundamental frequency $f_0$ and an order N of the spread spectrum signal according to the time sequence data;

Step 22, calculating a number of the main frequencies as $Nf=2^{N-1}$ according to the order N of the spread spectrum signal;

Step 23, calculating a frequency corresponding to each main frequency as $f_i=f_0*i$ according to the fundamental frequency $f_0$ of the spread spectrum signal, where i is a main frequency number from a low frequency to a high frequency;

Step 24, performing Fourier transform on the time sequence data to obtain a transformation result, and reading a k-th value as a frequency spectrum value Z of each main frequency in the transformation result, where k is a frequency point index of each main frequency.

In the embodiment of the present disclosure, a fifth-order spread spectrum signal with a fundamental frequency of 0.0625 Hz is taken as a specific embodiment to further explain the present disclosure.

Specifically, the time sequence data including voltage time sequence data and current time sequence data of the spread spectrum signal is acquired.

According to the time sequence data, the fundamental frequency is $f_0$=0.0625 Hz, the order of the spread spectrum induced polarization signal is a fifth-order, and the time sequence sampling rate is 64 Hz.

Specifically, according to the formula $Nf=2^{N-1}$, the number of main frequencies is calculated as Nf=16.

According to the formula $f_i$-$f_0$*i, i is a main frequency number from a low frequency to a high frequency. The calculated main frequency $f_0$ to f is are 0.0625 Hz, 0.125 Hz, 0.1875 Hz, 0.25 Hz, 0.3125 Hz, 0.375 Hz, 0.4375 Hz, 0.5 Hz, 0.5625 Hz, 0.625 Hz, 0.6875 Hz, 0.75 Hz, 0.8125 Hz, 0.875 Hz, 0.9375 Hz, and 1 Hz, respectively.

Fourier transform is performed on the voltage time sequence data and the current time sequence data, respectively, for two periods, so as to obtain the Fourier transform result U of the voltage and the Fourier transform result I of the current. Both U and I are arrays containing 2048 complex values, and the two periods are 2048 samples.

The complex results of the voltage time sequence data and the current time sequence data are acquired, which are 16 pieces of data, respectively, and the corresponding indexes in U and I are 2, 4, 6, 8, 10, 12, 14, 16, 18, 20, 22, 24, 26, 28, 30, 32.

Specifically, the obtaining a normalized complex value of each main frequency based on the frequency spectrum value of each main frequency includes:

acquiring a frequency spectrum value U of each main frequency in the voltage time sequence data by using a method of calculating the frequency spectrum value of each main frequency in the spread spectrum signal;

acquiring a frequency spectrum value I of each main frequency in the current time sequence data by using the method of calculating the frequency spectrum value of each main frequency in the spread spectrum signal; and calculating the normalized complex value of each main frequency as X=U/I according to the frequency spectrum value U of each main frequency in the voltage time sequence data and the frequency spectrum value I of each main frequency in the current time sequence data. According to the calculation formulas $X_i=U_i/I_i$, in which i=1~16, the normalized complex values $X_i$ of 16 main frequencies are calculated, respectively.

Specifically, a formula of calculating the frequency value $F_j$ of four combined frequency is:

$$F_j = \sum_{i=p}^{p+n-1} (w_i \times f_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $f_i$ is a frequency of the main frequency. The larger the value of L is, the more accurately the induced polarization parameters describe the spectral characteristics of rocks and minerals. The value of n depends on the interference, and when the interference is large, the value of n needs to be increased. When the interference of the corresponding main frequency point is large, $w_i$ of the main frequency can be reduced, and $w_i$ of other main frequencies can be increased, therefore, $$\sum_{i=p}^{p+n} w_i = 1.$$

In the embodiment of the present disclosure, if n=4, p=4*j, and $w_i$=0.25, the four combined frequencies are $F_0$=0.15625 Hz, $F_1$=0.8125 Hz, $F_2$=1.96875 Hz and $F_3$=3.625 Hz, respectively.

Specifically, a formula of calculating the normalized complex value $C_j$ of each combined frequency is:

$$C_j = \sum_{i=p}^{p+n-1} (w_i * X_i)$$

where p is an initial index of an initial main frequency, p has a value of (j−1)*L, L has a value in a range of [1,n], n is a number of the combined frequencies, $w_i$ is a frequency weighted value, and $w_i$ has a value of 1/n. The larger the value of L is, the more accurately the induced polarization parameters describe the spectral characteristics of rocks and minerals. The value of n depends on the interference, and when the interference is large, the value of n needs to be increased. When the interference of the corresponding main frequency point is large, the frequency weighting value $w_i$ of the main frequency can be reduced, and the frequency weighting value $w_i$ of other main frequencies can be increased, therefore, $$\sum_{i=p}^{p+n} w_i = 1.$$

$X_i$ is a normalized complex value of an i-th main frequency.

In the embodiment of the present disclosure, if n=4, p=4*j, and $w_i$=0.2, the normalized complex values of four combined frequencies are obtained. For subsequent calculation, it is assumed that the amplitudes of the calculated normalized complex values C; are 0.98, 0.97, 0.96, and 0.95, respectively, and the phases of the calculated normalized complex values $C_j$ are 1.0 mrad, 6.0 mrad, 10.0 mrad, and 15.0 mrad.

Specifically, a formula of calculating the apparent resistivity $\rho_j$ of four combined frequencies is:

$$\rho_j = k * |C_j|$$

where k is an apparatus coefficient calculated by a position of a receiving point and a position of a power supply point, and $C_j$ is a normalized complex value of a j-th combined frequency; and assuming k=100, the values of the apparent resistivity $\rho_j$ are 98, 97, 96 and 95, respectively.

A formula of calculating the percent frequency effect $fs_j$ of the first three combined frequencies is:

$$fs_j = (|C_j| - |C_h|)/|C_j|$$

or $$fs_j = (|C_j| - |C_h|)/|C_h|$$

where $C_j$ is a normalized complex value of the j-th combined frequency, $C_h$ is a normalized complex value of an h-th combined frequency, in which h=j+1. According to the above assumed values, the calculated results of the percent frequency effect are 1.02%, 1.03% and 1.04%.

Figure 2:
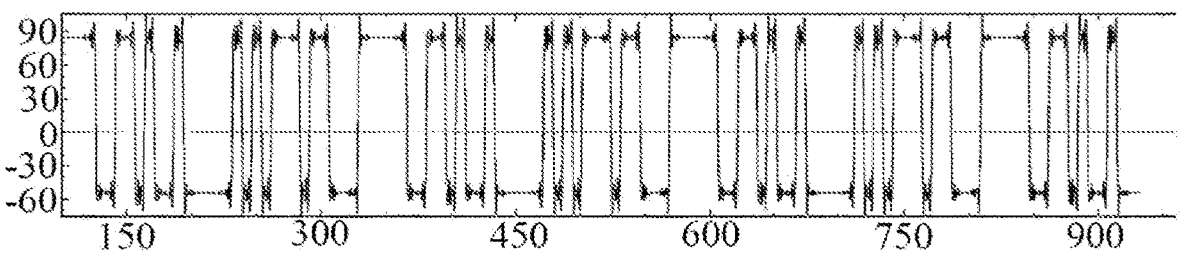
FIG. 2 is a timing diagram of a spread spectrum signal according to an embodiment of the present disclosure.

As shown in FIG. 2, the time sequence diagram of the fifth-order spread spectrum signal with the fundamental frequency of 1/16 Hz measured according to an embodiment of the present disclosure is shown. The abscissa of this diagram is the coordinate of sample points, and the ordinate is the signal amplitude (in the unit of mV). The sampling frequency of acquiring signals is 15 Hz, so that the single period of the spread spectrum wave has 240 sampling points. It can be seen from the figure that the outline of the spread spectrum signal only includes a high level and a low level, and some jitters on the level are induced signals and noises.

Figure 3:
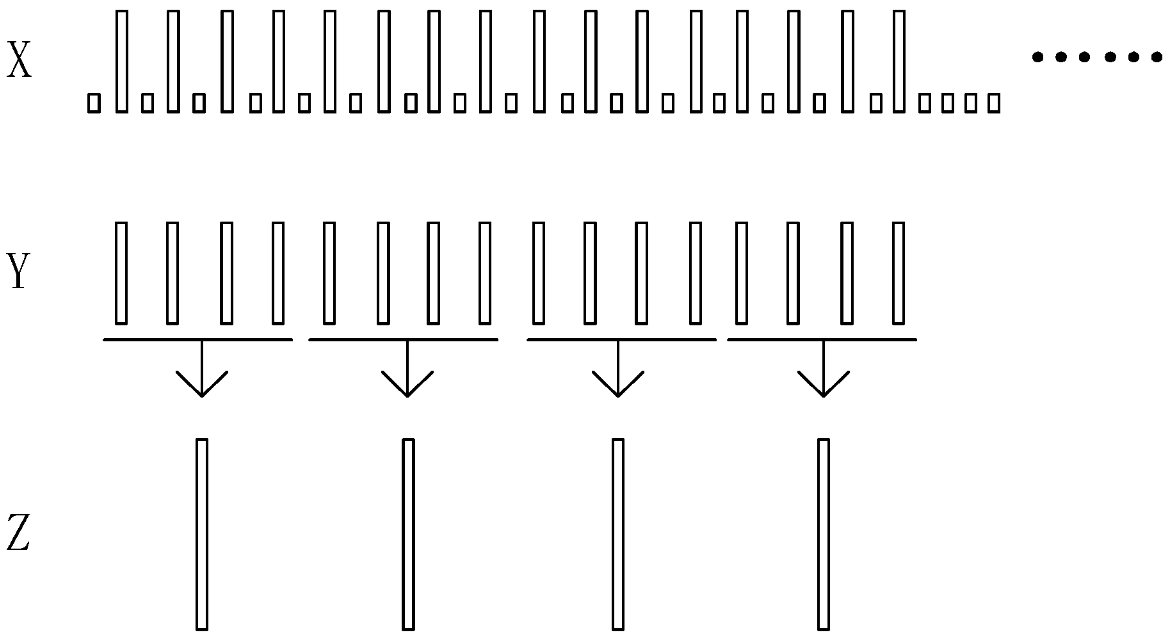
FIG. 3 is a schematic diagram of extracting and combining four combined frequencies calculated by a fifth-order spread spectrum signal according to an embodiment of the present disclosure.
Figure 4:
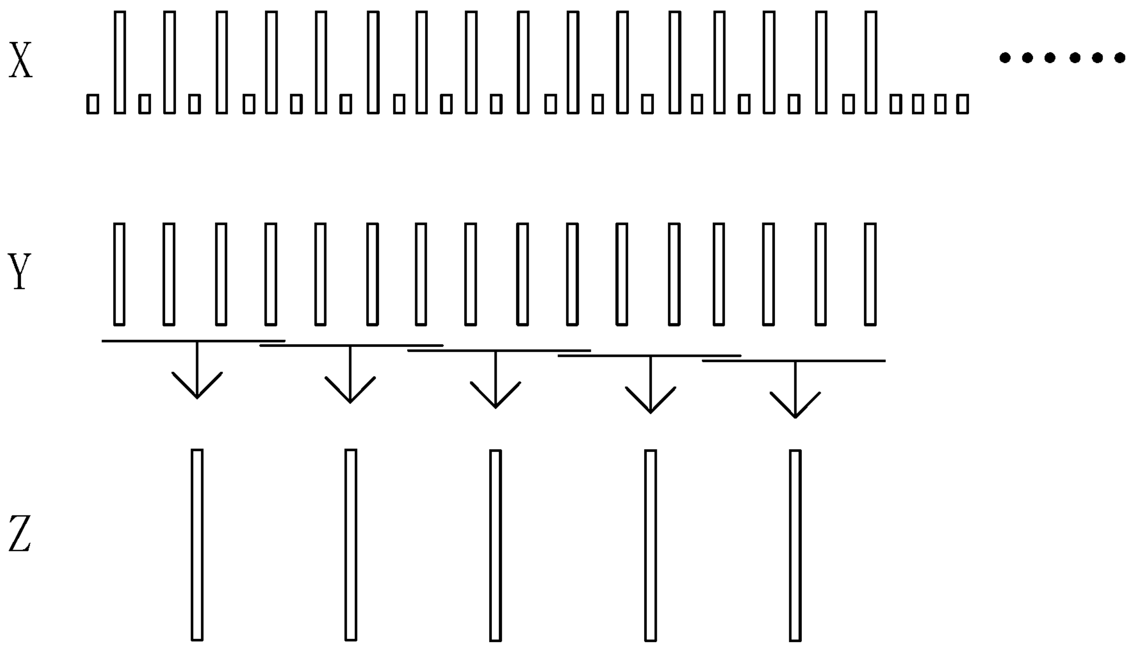
FIG. 4 is a schematic diagram of extracting and combining five combined frequencies calculated by the fifth-order spread spectrum signal according to an embodiment of the present disclosure.

As shown in FIG. 3 and FIG. 4, the figures include three types of data: X, Y and Z, where X is the result data of Fourier transform, Y is the extracted main frequency data, and Z is the combined frequency data. Each column in the figure represents a piece of data, and the length of the column represents the signal energy intensity. The corresponding Fourier transform periods in the two graphs are both 2. X data contains 16 main frequency signals, and there is a frequency point between the main frequencies. Y is 16 main frequency signals extracted from X data. Both FIG. 3 and FIG. 4 are combined using four main frequencies, but the starting frequency points of the combination of the two figures are inconsistent, so that the number of final combined frequencies is inconsistent, but the energy of the final combined frequencies changes to be about four times that of the original signal. The comparison of the main frequency distribution of different spread spectrum signals at the fundamental frequency of 1/16 Hz is shown in Table 1 below:

TABLE 1

| signal type | $F_0$(Hz) | $F_1$(Hz) | $F_2$(Hz) | $F_3$(Hz) | $F_4$(Hz) |
|---|---|---|---|---|---|
| square wave | 0.0625 | 0.1875 | 0.3125 | 0.4375 | 0.5625 |
| dual-frequency wave | 0.0625 | 0.8125 | — | — | — |
| fifth-order multi-frequency wave | 0.0625 | 0.125 | 0.25 | 0.5 | 1 |
| fifth-order spread-spectrum wave_combination A | 0.15625 | 0.21875 | 0.28125 | 0.34375 | 0.40625 |
| fifth-order spread-spectrum wave_combination B | 0.28125 | 0.78125 | — | — | — |

As can be seen from Table 1 above, the fifth-order spread spectrum wave contains the frequency distribution of two calculation parameters. The calculation parameter of combination A is (n=4, p=2.5+j, $w_i$=0.25, j is the index of combined frequency points starting from 0), and the calculation parameter of combination B is (n=8, p=8*j, $w_i$=0.125, j is the index of combined frequency points starting from 0). It can be seen from the figure that the frequency point interval of the square wave is 0.124 Hz. The frequency point interval of the dual-frequency wave is 0.75 Hz. The frequency point interval of the fifth-order multi-frequency wave is at least 0.0625 Hz, and then increases with the increase of frequency, and the maximum is 0.5 Hz. The frequency point interval of the spread spectrum wave combination A is 0.0625 Hz. The frequency point interval of the spread spectrum wave combination B is 0.5 Hz. Therefore, the method proposed by the present disclosure can obtain the densest frequency distribution as shown in the combination A and the sparse frequency distribution as shown in the combination B. The induced polarization parameters can be calculated by the combination A in exploration areas with small differences in spectral characteristics of rocks and minerals, and the induced polarization parameters can be calculated by the combination B in areas with large differences in spectral characteristics of rocks and minerals. The comparison of the main frequency energy distribution of different induced polarization signals at the fundamental frequency of 1/16 Hz is shown in Table 2 below:

TABLE 2

| signal type | $F_0$ energy | $F_1$ energy | $F_2$ energy | $F_3$ energy | $F_4$ energy |
|---|---|---|---|---|---|
| square wave | 1 | 0.33 | 0.2 | 0.14 | 0.11 |
| dual-frequency wave | 1 | 1 | — | — | — |
| fifth-order multi-frequency wave | 1 | 1 | 1 | 1 | 1 |
| fifth-order spread-spectrum wave_combination A | 4 | 4 | 4 | 4 | 4 |
| fifth-order spread-spectrum wave_combination B | 8 | 8 | — | — | — |

Table 2 shows the theoretical energy distribution of different induced polarization signals corresponding to the frequencies in Table 1 (the actual values will be slightly different due to different signal modulation methods), and the values shown in the table are normalized energy values (the main frequency energy divided by the fundamental frequency energy value). The calculation parameters of the spread spectrum wave combination A and the spread spectrum wave combination B are the same as those in Table 1. It can be seen from the table that the main frequency energy of the spread spectrum wave calculated by this scheme is greatly enhanced and the energy distribution is uniform. In the exploration area with less interference, the parameters of combination A can be used to calculate the induced polarization parameters, and in the area with greater interference, the parameters of combination B can be used to calculate the induced polarization parameters.

In induced polarization exploration, in order to measure the accurate induced polarization phase parameter $\varphi_0$ of the object, it is usually necessary to ensure strict synchronization between the transmitter and the receiver. However, in actual construction, the original phase difference $\varphi_1$ exists between the transmitter and the receiver due to hardware design or GPS synchronization accuracy ($\varphi_1$ is proportional to the frequency F), so that the actually measured induced polarization phase parameter $\varphi_2=\varphi_0+\varphi_1$, that is, the directly measured phase will produce an error $\varphi_1$.

A formula of calculating the comparative phase $cp_j$ of the first three combined frequencies is:

$$cp_j = (p - k * \varphi_j)/(1-k)$$

$$k = F_h / F_j$$

$$p = \begin{cases} \varphi_h, (\varphi_j - \pi \le \varphi_h \le \varphi_j + \pi) \\ \varphi_h - 2*\pi, (\varphi_h > \varphi_j + \pi) \\ \varphi_h + 2*\pi, (\varphi_h < \varphi_j - \pi) \end{cases}$$

where $\varphi_j$ is a comparative phase of the normalized complex value of the j-th combined frequency, $\varphi_h$ is a phase of the normalized complex value of the (j+1)-th combined frequency, $F_h$ is a frequency value of the (j+1)-th combined frequency, and $F_j$ is a frequency value of the j-th combined frequency. The calculated results are 2.125 mrad, 0.5 mrad and 3.125 mrad. Through this comparative phase calculation formula, some induced polarization coupling can be removed, which greatly reduces the distortion of induced polarization parameters and simultaneously ensures that the correct comparative phase value can still be calculated when the phases of adjacent frequency points are reversed.

For the convenience of explanation, if the range of $\varphi_h$ is $((\varphi j-\pi, \varphi j+\pi)$, $cp_j=(\varphi_h-k*\varphi_j)/(1-k)$. The phase error $\varphi_1$ of the transmitter and the receiver is taken into account. That is to say, $\varphi_h=\varphi_{h0}+\varphi_{h1}$ and $\varphi_j=\varphi_{j0}+\varphi_{j1}$ are substituted into the formula of calculating comparative phase $cp_j$, and $cp_j=(\varphi_{h0}-k*\varphi_{j0}+\varphi_{h1}-k*\varphi_{j1})/(1-k)$. Because $\varphi_1$ is directly proportional to the frequency F, $\varphi_{h1}=F_h/F_j*\varphi_{j1}=k*\varphi_{j1}$, which is substituted into the $cp_j$ formula, and then $cp_j=(\varphi_{h0}-k*\varphi_{j0})/(1-k)$. That is to say, the comparative phase $cp_j$ is only related to the polarization parameters of the object, thus eliminating the influence of synchronization errors of the transmitter and the receiver. Similarly, the primary term of the induced polarization coupling effect is also proportional to the frequency, and its primary term can also be eliminated by the formula of calculating the comparative phase. Therefore, this parameter can reduce the induced polarization coupling effect.

Figure 5A:
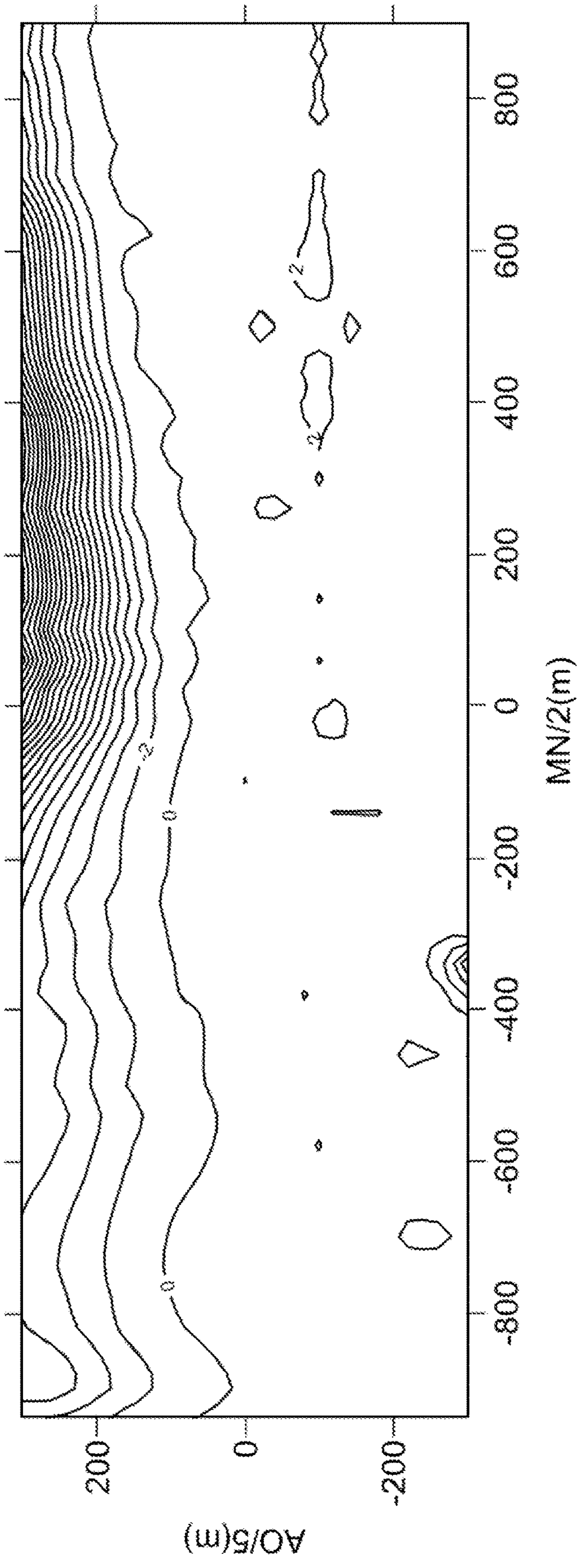
FIG. 5A-FIG. 5B are pseudo-cross-sectional views of cross sections calculated and drawn by using an embodiment of the present disclosure in the measured data in the field.
Figure 5B:
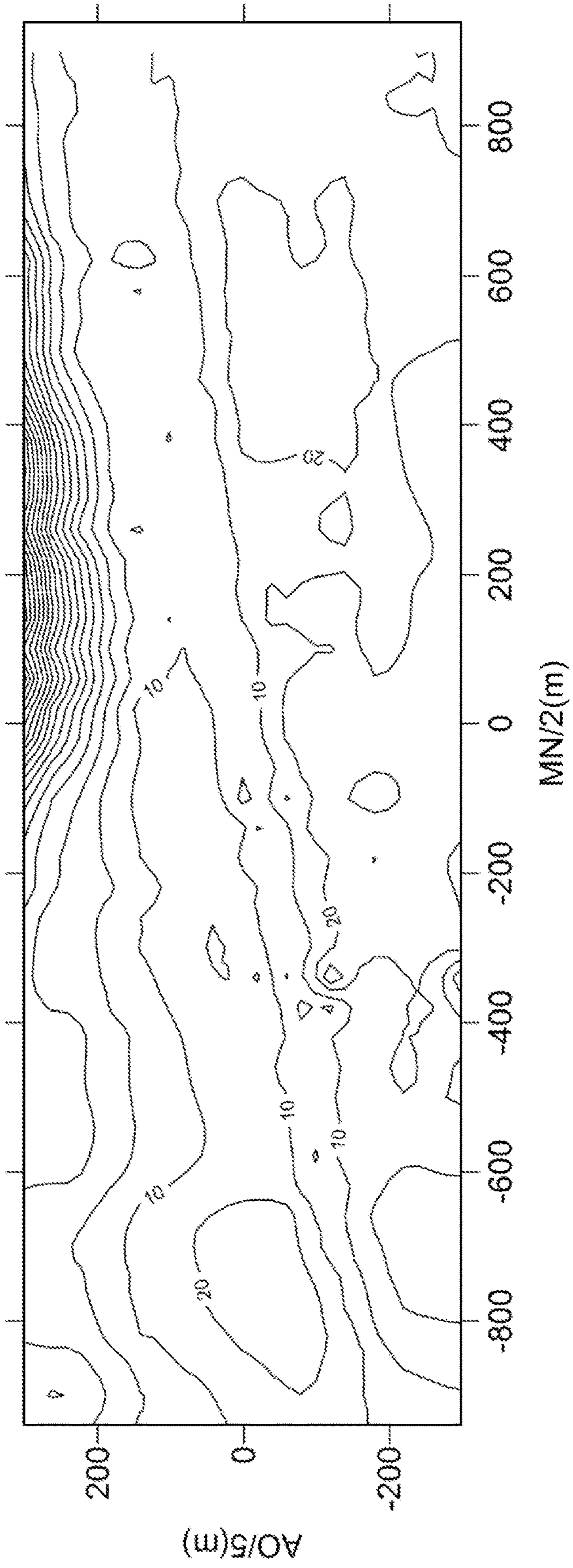

The pseudo-cross-sectional views of the cross sections drawn by using the measured data in the field according to an embodiment of the present disclosure are shown in FIG. 5A-FIG. 5B, which contains the percent frequency effect (FS) and the comparative phase (CP) parameters calculated by the fifth-order spread spectrum wave collected at the same time. The ordinate in the figure is the relative coordinate of a three-pole sounding power supply point A divided by 5, and the abscissa is the relative coordinate of the measuring point. The negative values of the percent frequency effect and the comparative phase in the figure are resulted from electromagnetic coupling. The greater the ratio of the minimum negative value to the maximum positive value is, the stronger the coupling induction is. The maximum positive value of the percent frequency effect in the figure is about 6, the minimum negative value is about −44, and the absolute ratio of the negative value to the positive value is about 7.33. The maximum positive value of the comparative phase parameter is about 47, the minimum negative value is about −160, and the ratio of the negative value to the positive value is about 3.4. Therefore, it can be concluded from the calculated numerical comparison that the electromagnetic coupling induction intensity of the comparative phase parameter is far less than that of the percent frequency effect. Moreover, it can be intuitively seen from the figure that the electromagnetic coupling induction range of the comparative phase parameter is far less than that of the percent frequency effect, and the abnormal morphological range shown by the comparative phase parameter is also clearer than that of the percent frequency effect. The test results show that the comparative phase calculated by the scheme of the present disclosure can remove part of induced polarization coupling, thus reducing the distortion of induced polarization parameters.

In the embodiment of the present disclosure, a spread spectrum signal is sent to a detection object and time sequence data of the spread spectrum signal is acquired; according to the time sequence data, a frequency spectrum value of each main frequency in the spread spectrum signal is acquired, and a normalized complex value of each main frequency is obtained based on the frequency spectrum value of each main frequency; a frequency value of each combined frequency in the spread spectrum signal is obtained according to the frequency value of each main frequency; the normalized complex value of each combined frequency is calculated according to the normalized complex value of each main frequency; induced polarization parameters of all combined frequencies are calculated according to the frequency values and the normalized complex values of all combined frequencies, where the induced polarization parameters include an apparent resistivity, a percent frequency effect and a comparative phase. According to the present disclosure, the function of acquiring the induced polarization parameters using the spread spectrum signal is implemented, and the problem that the induced polarization parameters measured by a conventional induced polarization method are distorted due to low frequency domain resolution, weak anti-interference capability and great coupling influence is solved. At the same time, according to the exploration requirements, the frequency density and the number of combined frequencies can also be customized, so as to accurately describe the induced polarization frequency spectral characteristics of rocks and minerals, enhance the signal energy of a single main frequency point and improve the anti-interference capability.

The embodiment of the present disclosure further provides an apparatus for acquiring induced polarization parameters by using a spread spectrum signal, which includes: a first acquisition module, a second acquisition module, a first calculation module, a second calculation module, and a third calculation module.

A first acquisition module, which is configured to send a spread spectrum signal to a detection object and acquire time sequence data of the spread spectrum signal, where the time sequence data includes voltage time sequence data and current time sequence data.

A second acquisition module, which is configured to acquire a frequency spectrum value of each main frequency in the spread spectrum signal according to the time sequence data, and obtain a normalized complex value of each main frequency based on the frequency spectrum value of each main frequency.

A first calculation module, which is configured to obtain a frequency value of each combined frequency in the spread spectrum signal according to the frequency value of each main frequency.

A second calculation module, which is configured to calculate a normalized complex value of each combined frequency according to the normalized complex value of each main frequency.

A third calculation module, which is configured to calculate induced polarization parameters of all combined frequencies according to frequency values of all combined frequencies and normalized complex values of all combined frequencies, where the induced polarization parameters include an apparent resistivity, a percent frequency effect and a comparative phase.

It should be noted that since the information interaction, the execution process and other content between the above apparatuses/units are based on the same concept as the method embodiment of the embodiment of the present disclosure, their specific functions and technical effects can refer to the method embodiment section for details, which will not be described in detail here.

It can be clearly understood by those skilled in the art that for the convenience and conciseness of description, only the division of the above-mentioned functional units and modules is taken as an example. In practical application, the above-mentioned functional allocation can be completed by different functional units and modules as required. That is to say, the internal structure of the apparatus is divided into different functional units or modules to complete all or part of the functions described above. Each of the functional units and modules in the embodiment can be integrated into one processing unit, or each of the units can exist physically alone, or two or more units can be integrated into one unit. The integrated units can be implemented in the form of hardware or software functional units. In addition, the specific names of each of the functional units and modules are only for the convenience of distinguishing each other, and are not used to limit the scope of protection of the embodiment of the present disclosure. The specific working processes of the units and modules in the above-mentioned system can refer to the corresponding processes in the above-mentioned method embodiments, which will not be described in detail here.

The embodiment of the present disclosure further provides a non-transitory computer-readable storage medium in which a computer program is stored, where the computer program, when executed, is configured to implement the method for acquiring induced polarization parameters by using the spread spectrum signal described above.

The integrated unit can be stored in a non-transitory computer-readable storage medium if it is implemented in the form of a software functional unit and sold or used as an independent product. Based on this understanding, the embodiment of the present disclosure can implement all or part of the processes in the above embodiment method, which can be completed by instructing related hardware through a computer program. The computer program can be stored in a non-transitory computer-readable storage medium, and when executed by a processor, can implement the steps of the above method embodiments. The computer program includes a computer program code, which can be in the form of a source code, an object code, an executable file or in some intermediate form, etc. The computer-readable medium can at least include any of an entity or an apparatus, a recording medium, a computer memory, a Read-Only Memory (ROM), a Random Access Memory (RAM), an electric carrier signal, a telecommunication signal and a software distribution medium that can carry computer program code to a construction apparatus/terminal device, for example, a USB flash drive, a removable hard disk, a magnetic disk or an optical disk. In some jurisdictions, according to legislation and patent practice, the computer-readable media cannot be an electric carrier signal or a telecommunication signal.

The embodiment of the present disclosure further provides a device for acquiring induced polarization parameters by using a spread spectrum signal, where the device is configured to implement the method described above, including:

a memory and a processor; where the memory is configured to store a computer program; and the processor is configured to execute the computer program stored in the memory.

It should be noted that the terminal device can be a mobile phone, a tablet computer, a notebook computer, an Ultra-mobile Personal Computer (UMPC), a netbook, a Personal Digital Assistant (PDA) and other terminal devices. For example, the terminal device can be a STAION (ST) in WLAN, a cellular phone, a cordless phone, a Session Initiation Protocol (SIP) phone, a Wireless Local Loop (WLL) station, a Personal Digital Assistant (PDA) device, a handheld device with a wireless communication function, a computing devices or other processing devices connected to wireless modems, a computer, a laptop computer, a handheld communication device, a handheld computing device, a satellite wireless device, etc. The embodiment of the present disclosure does not limit the specific types of terminal devices.

The processor may be a Central Processing Unit (CPU). The processor may also be other general processors, Digital Signal Processors (DSPs), Application Specific Integrated Circuits (ASICs), Field-Programmable Gate Arrays (FPGAs) or other programmable logic devices, discrete gates or transistor logic devices, discrete hardware components, etc. The general processor may be a microprocessor or the processor may be any conventional processor, etc.

In some embodiments, the memory may be an internal storage unit of the terminal device, such as a hard disk or a memory of the terminal device. In other embodiments, the memory may also be an external storage device of the terminal device, such as a plug-in hard disk, a Smart Media Card (SMC), a Secure Digital (SD) card, a flash card, etc. provided on the terminal device. Further, the memory may also include both an internal storage unit and an external storage device of the terminal device. The memory is configured to store an operating system, an application program, a BootLoader, data and other programs, such as the program code of the computer program. The memory can also be configured to temporarily store data that has been or will be output.

It should be noted that since the information interaction, the execution process and other content between the above apparatuses/units are based on the same concept as the method embodiment of the embodiment of the present disclosure, their specific functions and technical effects can refer to the method embodiment section for details, which will not be described in detail here. The above is the preferred embodiment of the present disclosure. It should be pointed out that those skilled in the art can make several improvements and embellishments without departing from the principle of the present disclosure, and these improvements and embellishments should also be regarded as the scope of protection of the present disclosure.

The invention claimed is:

1. A method for acquiring induced polarization parameters by using a spread spectrum signal, comprising:

step 1, sending a spread spectrum signal to a detection object and acquiring time sequence data of the spread spectrum signal, wherein the time sequence data comprises voltage time sequence data and current time sequence data;

step 2, according to the time sequence data, acquiring a frequency spectrum value of each main frequency in the spread spectrum signal, and obtaining a normalized complex value of each main frequency based on the frequency spectrum value of each main frequency;

step 3, obtaining a frequency value of each combined frequency in the spread spectrum signal according to the frequency value of each main frequency;

step 4, calculating a normalized complex value of each combined frequency according to the normalized complex value of each main frequency; and step 5, calculating induced polarization parameters of all combined frequencies according to frequency values of all combined frequencies and normalized complex values of all combined frequencies, wherein the induced polarization parameters comprise an apparent resistivity, a percent frequency effect and a comparative phase.

2. The method for acquiring induced polarization parameters by using the spread spectrum signal according to claim 1, wherein the step 2 comprises:

step 21, acquiring a fundamental frequency $f_0$ and an order N of the spread spectrum signal according to the time sequence data;

step 22, calculating a number of the main frequencies as $Nf=2^{N-1}$ according to the order N of the spread spectrum signal;

step 23, calculating a frequency corresponding to each main frequency as $f_i=f_0*i$ according to the fundamental frequency $f_0$ of the spread spectrum signal, where i is a main frequency number from a low frequency to a high frequency; and step 24, performing Fourier transform on the time sequence data to obtain a transformation result, and reading a k-th value as a frequency spectrum value Z of each main frequency in the transformation result, where k is a frequency point index of each main frequency.

3. The method for acquiring induced polarization parameters by using the spread spectrum signal according to claim 2, wherein the obtaining a normalized complex value of each main frequency based on the frequency spectrum value of each main frequency comprises:

acquiring a frequency spectrum value U of each main frequency in the voltage time sequence data by using a method of calculating the frequency spectrum value of each main frequency in the spread spectrum signal;

acquiring a frequency spectrum value I of each main frequency in the current time sequence data by using the method of calculating the frequency spectrum value of each main frequency in the spread spectrum signal; and calculating the normalized complex value of each main frequency as X=U/I according to the frequency spectrum value U of each main frequency in the voltage time sequence data and the frequency spectrum value I of each main frequency in the current time sequence data.

4. The method for acquiring induced polarization parameters by using the spread spectrum signal according to claim 3, wherein a formula of calculating the normalized complex value $C_j$ of the combined frequency is:

$$C_j = \sum_{i=p}^{p+n-1} (w_i * X_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $X_i$ is a normalized complex value of an i-th main frequency.

5. The method for acquiring induced polarization parameters by using the spread spectrum signal according to claim 4, wherein a formula of calculating the resistivity $\rho_j$ is:

$$\rho_j = k * |C_j|$$

where k is an apparatus coefficient calculated by a position of a receiving point and a position of a power supply point, and $C_j$ is an normalized complex value of a j-th combined frequency;

a formula of calculating the percent frequency effect $fs_j$ is:

$$fs_j = (|C_j| - |C_h|)/|C_j|$$

$$fs_j = (|C_j| - |C_h|)/|C_h|$$

where $C_j$ is a normalized complex value of the j-th combined frequency, $C_h$ is a normalized complex value of an h-th combined frequency, in which h=j+1;

a formula of calculating the comparative phase $cp_j$ is:

$$cp_j = (p - k * \varphi_j)/(1 - k)$$

$$k = F_h / F_j$$

$$p = \begin{cases} \varphi_h, & (\varphi_j - \pi \le \varphi_h \le \varphi_j + \pi) \\ \varphi_h - 2*\pi, & (\varphi_h > \varphi_j + \pi) \\ \varphi_h + 2*\pi, & (\varphi_h < \varphi_j - \pi) \end{cases}$$

where $\varphi_j$ is a phase of the normalized complex value of the j-th combined frequency, $\varphi_h$ is a phase of the normalized complex value of the h-th combined frequency, $F_h$ is a frequency value of the h-th combined frequency, and $F_j$ is a frequency value of the j-th combined frequency.

6. The method for acquiring induced polarization parameters by using the spread spectrum signal according to claim 2, wherein a formula of calculating the frequency value $F_j$ of the combined frequency is:

$$F_j = \sum_{i=p}^{p+n-1} (w_i \times f_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $f_i$ is a frequency of the main frequency.

7. A non-transitory computer-readable storage medium in which a computer program is stored, wherein the computer program, when executed, is configured to implement the method for acquiring induced polarization parameters by using the spread spectrum signal according to claim 1.

8. The non-transitory computer-readable storage medium according to claim 7, wherein the step 2 comprises:

step 21, acquiring a fundamental frequency $f_0$ and an order N of the spread spectrum signal according to the time sequence data;

step 22, calculating a number of the main frequencies as $Nf=2^{N-1}$ according to the order N of the spread spectrum signal;

step 23, calculating a frequency corresponding to each main frequency as $f_i=f_0*i$ according to the fundamental frequency $f_0$ of the spread spectrum signal, where i is a main frequency number from a low frequency to a high frequency; and step 24, performing Fourier transform on the time sequence data to obtain a transformation result, and reading a k-th value as a frequency spectrum value Z of each main frequency in the transformation result, where k is a frequency point index of each main frequency.

9. The non-transitory computer-readable storage medium according to claim 8, wherein the obtaining a normalized complex value of each main frequency based on the frequency spectrum value of each main frequency comprises:

acquiring a frequency spectrum value U of each main frequency in the voltage time sequence data by using a method of calculating the frequency spectrum value of each main frequency in the spread spectrum signal;

acquiring a frequency spectrum value I of each main frequency in the current time sequence data by using the method of calculating the frequency spectrum value of each main frequency in the spread spectrum signal; and calculating the normalized complex value of each main frequency as X=U/I according to the frequency spectrum value U of each main frequency in the voltage time sequence data and the frequency spectrum value I of each main frequency in the current time sequence data.

10. The non-transitory computer-readable storage medium according to claim 9, wherein a formula of calculating the normalized complex value $C_j$ of the combined frequency is:

$$C_j = \sum_{i=p}^{p+n-1}(w_i * X_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $X_i$ is a normalized complex value of an i-th main frequency.

11. The non-transitory computer-readable storage medium according to claim 10, wherein a formula of calculating the resistivity $\rho_j$ is:

$$\rho_j = k * |C_j|$$

where k is an apparatus coefficient calculated by a position of a receiving point and a position of a power supply point, and $C_j$ is an normalized complex value of a j-th combined frequency;

a formula of calculating the percent frequency effect $fs_j$ is:

$$fs_j = (|C_j| - |C_h|)/|C_j|$$

$$fs_j = (|C_j| - |C_h|)/|C_h|$$

where $C_j$ is a normalized complex value of the j-th combined frequency, $C_h$ is a normalized complex value of an h-th combined frequency, in which h=j+1;

a formula of calculating the comparative phase $cp_j$ is:

$$cp_j = (p - k * \varphi_j)/(1 - k)$$

$$k = F_h/F_j$$

$$p = \begin{cases} \varphi_h, (\varphi_j - \pi \le \varphi_h \le \varphi_j + \pi) \\ \varphi_h - 2*\pi, (\varphi_h > \varphi_j + \pi) \\ \varphi_h + 2*\pi, (\varphi_h < \varphi_j - \pi) \end{cases}$$

where $\varphi_j$ is a phase of the normalized complex value of the j-th combined frequency, $\varphi_h$ is a phase of the normalized complex value of the h-th combined frequency, $F_h$ is a frequency value of the h-th combined frequency, and $F_j$ is a frequency value of the j-th combined frequency.

12. The non-transitory computer-readable storage medium according to claim 8, wherein a formula of calculating the frequency value $F_j$ of the combined frequency is:

$$F_j = \sum_{i=p}^{p+n-1}(w_i \times f_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $f_i$ is a frequency of the main frequency.

13. A device for acquiring induced polarization parameters by using a spread spectrum signal, wherein the device is configured to implement the method for acquiring induced polarization parameters by using the spread spectrum signal according to claim 1, comprising:

a memory and a processor; wherein the memory is configured to store a computer program; and the processor is configured to execute the computer program stored in the memory.

14. The device according to claim 13, wherein the step 2 comprises:

step 21, acquiring a fundamental frequency $f_0$ and an order N of the spread spectrum signal according to the time sequence data;

step 22, calculating a number of the main frequencies as $Nf=2^{N-1}$ according to the order N of the spread spectrum signal;

step 23, calculating a frequency corresponding to each main frequency as $f_i=f_0*i$ according to the fundamental frequency $f_0$ of the spread spectrum signal, where i is a main frequency number from a low frequency to a high frequency; and step 24, performing Fourier transform on the time sequence data to obtain a transformation result, and reading a k-th value as a frequency spectrum value Z of each main frequency in the transformation result, where k is a frequency point index of each main frequency.

15. The device according to claim 14, wherein the obtaining a normalized complex value of each main frequency based on the frequency spectrum value of each main frequency comprises:

acquiring a frequency spectrum value U of each main frequency in the voltage time sequence data by using a method of calculating the frequency spectrum value of each main frequency in the spread spectrum signal;

acquiring a frequency spectrum value I of each main frequency in the current time sequence data by using the method of calculating the frequency spectrum value of each main frequency in the spread spectrum signal; and calculating the normalized complex value of each main frequency as X=U/I according to the frequency spectrum value U of each main frequency in the voltage time sequence data and the frequency spectrum value I of each main frequency in the current time sequence data.

16. The device according to claim 15, wherein a formula of calculating the normalized complex value $C_j$ of the combined frequency is:

$$C_j = \sum_{i=p}^{p+n-1} (w_i * X_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $X_i$ is a normalized complex value of an i-th main frequency.

17. The device according to claim 16, wherein a formula of calculating the resistivity $\rho_j$ is:

$$\rho_j = k * |C_j|$$

where k is an apparatus coefficient calculated by a position of a receiving point and a position of a power supply point, and $C_j$ is an normalized complex value of a j-th combined frequency;

a formula of calculating the percent frequency effect $fs_j$ is:

$$fs_j = (|C_j| - |C_h|)/|C_j|$$

$$fs_j = (|C_j| - |C_h|)/|C_h|$$

where $C_j$ is a normalized complex value of the j-th combined frequency, $C_h$ is a normalized complex value of an h-th combined frequency, in which h=j+1;

a formula of calculating the comparative phase $cp_j$ is:

$$cp_j = (p - k * \varphi_j)/(1 - k)$$

$$k = F_h/F_j$$

$$p = \begin{cases} \varphi_h, & (\varphi_j - \pi \le \varphi_h \le \varphi_j + \pi) \\ \varphi_h - 2*\pi, & (\varphi_h > \varphi_j + \pi) \\ \varphi_h + 2*\pi, & (\varphi_h < \varphi_j - \pi) \end{cases}$$

where $\varphi_j$ is a phase of the normalized complex value of the j-th combined frequency, $\varphi_h$ is a phase of the normalized complex value of the h-th combined frequency, $F_h$ is a frequency value of the h-th combined frequency, and $F_j$ is a frequency value of the j-th combined frequency.

18. The device according to claim 14, wherein a formula of calculating the frequency value $F_j$ of the combined frequency is:

$$F_j = \sum_{i=p}^{p+n-1} (w_i \times f_i)$$

where p is an initial index of an initial main frequency, p has a value of (j−1)*L, L has a value in a range of [1,n], n is a number of the combined frequencies, $w_i$ is a frequency weighted value, $w_i$ has a value of 1/n, and $f_i$ is a frequency of the main frequency.

* * * * *